(12) United States Patent
Shivaram et al.

(10) Patent No.: US 7,548,754 B2
(45) Date of Patent: Jun. 16, 2009

(54) AUTHENTICATION AND NON-INTERFERING SMS-MESSAGING IN GSM TELEPHONE COMMUNICATION

(75) Inventors: Asha Attur Shivaram, Karnataka (IN); Sreedhar Nivarti, Karnataka (IN); Narendra Venkataraman, Karnataka (IN); Palpandian Balakrishnan, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1197 days.

(21) Appl. No.: 10/412,024

(22) Filed: Apr. 11, 2003

(65) Prior Publication Data

US 2004/0203963 A1    Oct. 14, 2004

(51) Int. Cl.
*H04W 4/00* (2009.01)
(52) U.S. Cl. ................. 455/466; 455/414.1; 705/14
(58) Field of Classification Search ............ 455/466; 705/14
See application file for complete search history.

(56) References Cited

U.S. PATENT DOCUMENTS

| | | | |
|---|---|---|---|
| 5,948,061 A * | 9/1999 | Merriman et al. | 705/14 |
| 6,381,465 B1 * | 4/2002 | Chern et al. | 455/466 |
| 6,450,407 B1 * | 9/2002 | Freeman et al. | 235/492 |
| 6,505,046 B1 * | 1/2003 | Baker | 455/456.3 |
| 6,647,269 B2 * | 11/2003 | Hendrey et al. | 455/456.3 |
| 6,771,974 B1 * | 8/2004 | Sim et al. | 455/466 |
| 6,879,838 B2 * | 4/2005 | Rankin et al. | 455/456.6 |
| 6,907,239 B1 * | 6/2005 | Sivula | 455/406 |
| 6,934,533 B2 * | 8/2005 | Joyce et al. | 455/414.1 |
| 6,944,150 B1 * | 9/2005 | McConnell et al. | 370/352 |
| 6,968,180 B2 * | 11/2005 | Kirby et al. | 455/414.1 |
| 7,124,092 B2 * | 10/2006 | O'Toole et al. | 705/14 |
| 7,319,862 B1 * | 1/2008 | Lincoln et al. | 455/414.1 |
| 7,349,668 B2 * | 3/2008 | Ilan et al. | 455/66.1 |
| 2002/0131444 A1 * | 9/2002 | Moodie et al. | 370/463 |
| 2003/0083934 A1 * | 5/2003 | Fostick et al. | 705/14 |
| 2003/0118182 A1 * | 6/2003 | Elomaa et al. | 380/203 |
| 2004/0128324 A1 * | 7/2004 | Sheynman et al. | 707/200 |

FOREIGN PATENT DOCUMENTS

| | | |
|---|---|---|
| DE | 10143496 | 3/2003 |
| EP | 1262930 | 12/2002 |
| WO | WO 02/061608 | 8/2002 |
| WO | WO 02/103968 | 12/2002 |
| WO | WO 03/005145 | 1/2003 |
| WO | WO 03/094457 | 11/2003 |

* cited by examiner

*Primary Examiner*—Simon Sing

(57) ABSTRACT

A method for transmitting SMS messages to a subscriber GSM telephone after a call is ended and authenticating the source of the delivered text message with a logo or other graphic not forwardable by mobile phone subscribers is provided. In the present invention, audio advertisements are selected based on a mobile phone subscriber's profile, and accompanying SMS messages or m-coupons are further transmitted to the subscriber only upon their request. A check will be carried out on the eligibility of the subscriber to receive the SMS message they had requested for. This check limits the number of times the subscriber receives a same SMS message. If the subscriber is eligible to receive the message, an authenticating symbol is included in the SMS message before transmission so that retransmission to other users will delete the graphic and render the SMS message invalid for business transactions.

14 Claims, 2 Drawing Sheets

AUTHENTICATION AND NON-INTERFERING SMS-MESSAGING IN GSM TELEPHONE COMMUNICATION

BACKGROUND OF THE INVENTION

1. Field of the Invention

The present invention relates to GSM telephone communications that use short message service (SMS) text messaging, and more particularly to the delivery of any SMS text after a call is ended and authenticating the source of the delivered text message with a logo or other graphic not forwardable by mobile phone subscribers.

2. Description of Background Information

The Short Message Service (SMS) defines sending and receiving mobile telephone text messages. SMS is part of the Global System for Mobile communications (GSM) digital standard. An SMS text can comprise of words or numbers or an alphanumeric combination for up to 160 characters of text in length using default GSM alphabet coding. SMS has become extremely popular because it can be used when voice is not the easiest or best communications medium. For example, it may be difficult or troublesome to listen to a voice call, jot down information at the same time and enter the information into the memory of the mobile phone. SMS provides an easy way to send information to a mobile phone subscriber and retrieve it later from the mobile telephone's local memory.

Apart from transmission of simple information, SMS is increasingly used as an advertising channel such as with a "Sponsored Call" service application. The Sponsored Call service provides a mobile phone subscriber an option to listen to a pre-recorded audio advertisement provided by a sponsor and to receive a portion of their call paid for by the sponsor. When the mobile phone subscriber chooses to listen to an audio message—typically an advertisement message, they may also simultaneously receive an SMS message relating to the audio message for future access to the same information. The SMS text message is displayed on the mobile phone and stored in the local phone memory.

The conventional Sponsored Call service has a few disadvantages. Although the Sponsored Call service integrates audio and SMS advertising, the accompanying SMS text message is automatically sent to the subscriber simultaneous with the audio advertisement message. Subscribers may be bothered by these unwanted SMS messages, and the advertising effect may therefore be reduced. Some of these SMS messages may contain discounts to products and services, e.g., electronic or mobile coupons ("m-coupons"). But offering m-coupons through SMS messages to every subscriber listening to the audio message, and allowing the SMS message to be easily forwarded to other subscribers, reduces the appeal and apparent worth of the m-coupons.

SUMMARY OF INVENTION

The present invention relates to a method and a system for transmitting audio and SMS messages to a mobile phone subscriber in a mobile telecommunications network and authenticating the source of the SMS message.

According to a method embodiment of the present invention, a Sponsor Call service is initiated by a mobile phone subscriber. The subscriber is identified and appropriate audio advertisement messages and/or SMS messages are selected according to the subscriber profile information maintained in a database. The audio message is transmitted and played to the subscriber. If the subscriber wants to receive an associated SMS message or m-coupon, they are prompted to press a particular request key. A test is made to see if the subscriber is eligible to receive such SMS message. If not, an alternative message is sent. An authenticating symbol may be included in a User Data Header of the SMS message so that if the subscriber tries to forward the message to another mobile phone user, the authenticating symbol will be missing and thus indicate the source is not the sponsor.

An advantage of the present invention is a system is provided that always delivers SMS messages non-intrusively and timely, each SMS message is transmitted only on subscriber request and only after the underlying telephone call has ended.

Another advantage of the present invention is a method is provided for using an authenticating symbol in each message that helps prevent the impersonation of advertisers and limit the duplication of message.

DETAILED DESCRIPTION

Figure 1:
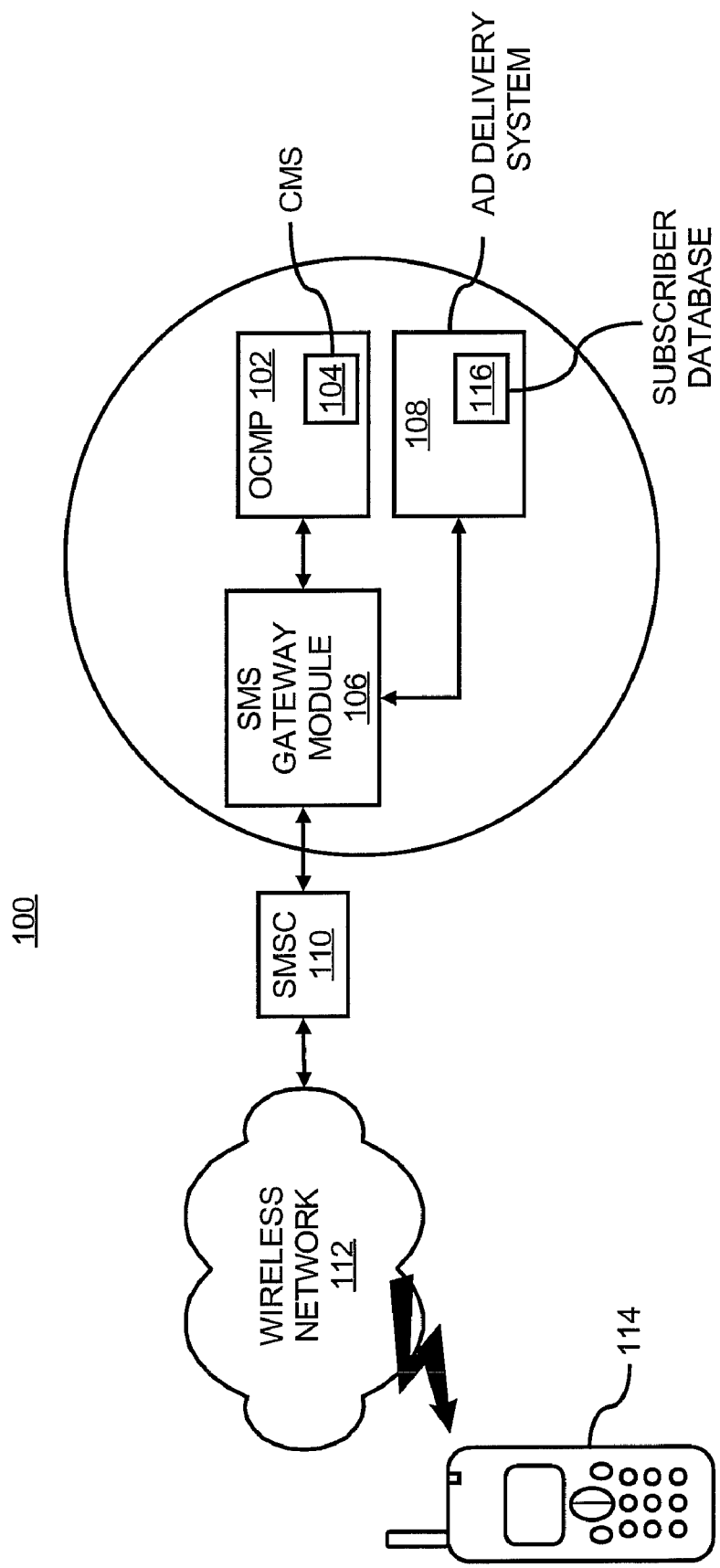
FIG. 1 is a functional block diagram of a GSM-SMS phone embodiment of the present invention.

FIG. 1 represents a system embodiment of the present invention, and is referred to herein by the general reference numeral 100. The system 100 comprises an OpenCall Media Platform 102 (OCMP), a Call Media Server 104 (CMS) as part of the OCMP 102, an SMS gateway module 106, an advertisement (ad) delivery system 108, an operator's SMS center 110 (SMSC), a wireless telecommunications network 112, and a mobile phone unit 114. For example, the OpenCall Media Platform 102 can be implemented with a voice service platform that enables rapid development, and secure deployment of next generation unified communications, portals and enhanced voice-enabled interactive services, directly into service provider networks. See Hewlett-Packard OpenCall platforms described at www.hp.com/communications/opencall. HP OpenCall is a suite of comprehensive, carrier-grade platforms for developing and deploying next-generation voice, data and converged services. HP OpenCall platforms connect to any network and enable people to use phones to communicate, access information, and conduct transactions in an always-on infrastructure.

The Call Media Server 104 (CMS) is preferably implemented with a Java service that runs on the OCMP 102. It deals with call progression of mobile telephone subscribers and includes a call state machine to handle a sponsored call. The CMS 104 connects incoming calls to destination numbers, updates remaining free airtime, interfaces with the Ad Delivery system 108 to play audio messages, and transmits DTMF tone requests for SMS text messages to the SMS gateway module 106. The Call Media Server 104 connects an incoming call to a specified destination party, disconnects the call parties at the end of a call and disconnects a trunk leg to play advertisements and messages. Further, the CMS 104 plays an initial audio message and audio advertisement message for sponsored calls, detects a change from a sponsored to a non-sponsored mode, interfaces with an advertisement management system of the Ad Delivery system 108 for retrieving a list of advertisements, and transmits the DTMF tones from a subscriber to the SMS gateway module 106.

The SMS Gateway module 106 transmits SMS messages and m-coupons to subscriber requesting them by pressing a predetermined DTMF key while listening to an audio advertisement during a sponsored call. Prior to transmitting the SMS message to the subscriber, the SMS gateway 106 fetches the requested SMS message from the Ad Delivery System 108. The SMS gateway 106 also decides whether to transmit the m-coupon to the subscriber, and if it decides to transmit then it automatically inserts an authenticating symbol into the coupons to guard against source impersonation and fraud.

The Ad Delivery system 108 includes a database for advertisement and subscriber profile management. The advertisement management function associates the audio advertisements with corresponding SMS m-coupons. It tracks which SMS m-coupons have already been offered to the subscriber to prevent duplications. The subscriber profile management function associates subscribers and their profiles to find an appropriate set of audio advertisement messages to deliver during a sponsored call.

Figure 2:
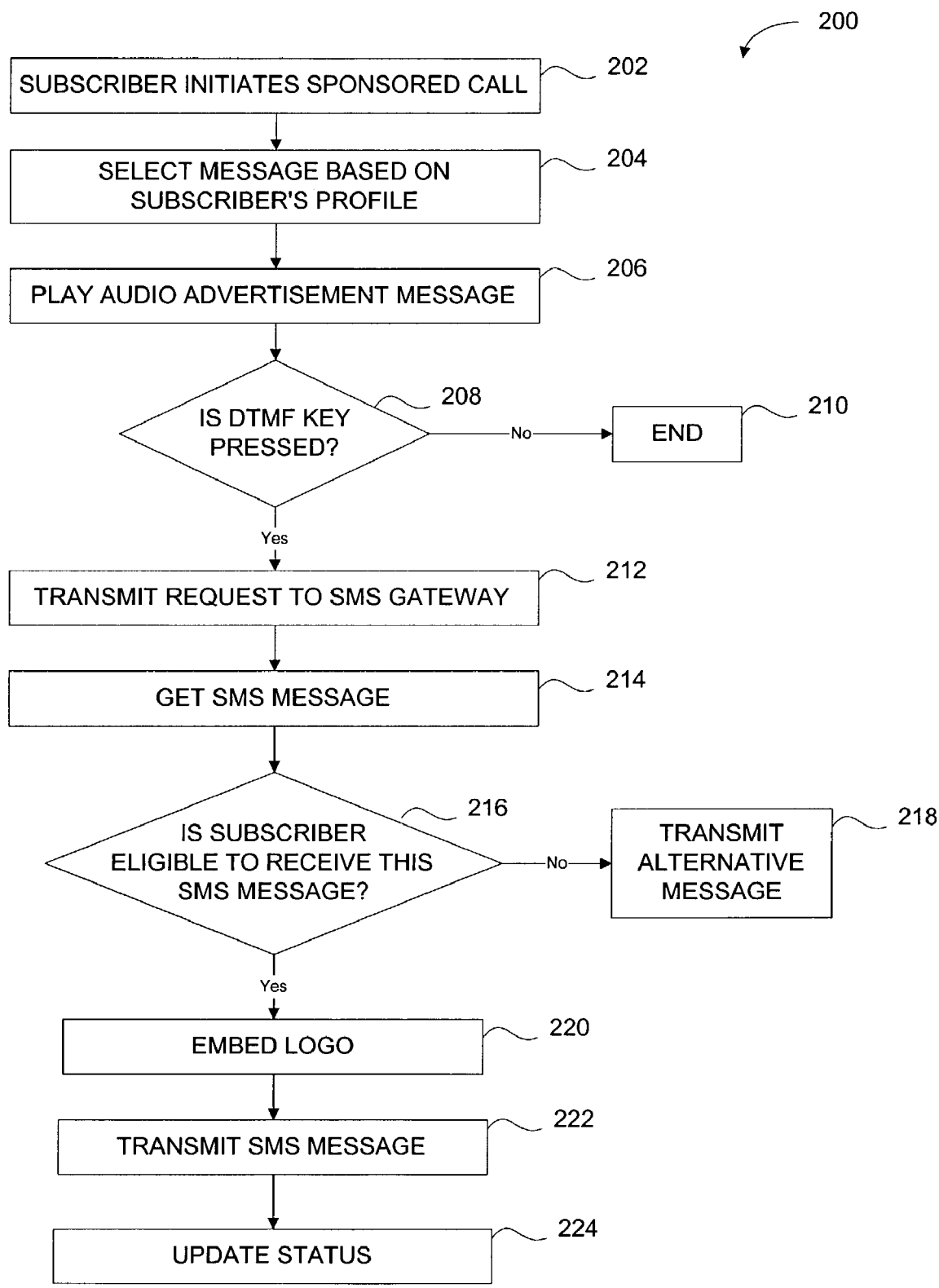
FIG. 2 is a flowchart diagram of a method embodiment of the present invention.

FIG. 2 represents a method embodiment of the present invention, and is referred to herein by the general reference numeral 200. The method 200 starts in a SUBSCRIBER INITIATES SPONSORED CALL step 202, where a mobile phone subscriber initiates a call and selects the Sponsor Call service. Such Sponsor Call service provides a subsidy by a sponsor in return for accepting an advertisement message from the sponsor. The call is lodged, for example, with the OCMP 102 (FIG. 1) and received by the Call Media Server 104.

The Call Media Server 104 queries the Ad Delivery System 108 to select pre-recorded audio advertisement messages based on the subscriber's profile in a SELECT MESSAGE BASED ON SUBSCRIBER'S PROFILE step 204. Such messages are targeted to the preferences of the particular subscribers. Subscriber preferences and areas of interest are stored in a database in the Ad Delivery System 108, e.g., a subscriber database 116. A process in the Ad Delivery system 108 matches the subscriber to a corresponding subscriber profile in the subscriber database 116 and accesses the database contents in a SELECT MESSAGE BASED ON SUBSCRIBER'S PROFILE step 204. The subscriber is identified by a Subscriber Identity Module (SIM). In step 204, audio advertising messages are selected and SMS messages are pre-associated with each audio message. Alternatively, step 204 may extend to support the selection of both audio and SMS messages. The purpose in selecting advertisements based on a subscriber's profile is to increase the effectiveness of the advertising. An example of a subscriber's profile may be a location-based factor. A location server may be integrated with the OpenCall Media Platform 102 so that the location of the subscriber at the time of initiating the call cal be one determinant in selecting appropriate audio advertisement messages. The current location of the subscriber may be determined using GSM technology, Global Positioning System (GPS) technology, etc.

In a PLAY AUDIO ADVERTISEMENT MESSAGE step 206, the appropriate audio messages are transmitted through wireless telecommunication network 112 and played to the subscriber.

During or after the audio advertisement message, the subscriber can choose, e.g., to receive an m-coupon for "30% discount on all GOR-MAY products". The choices are lodged by the user by pressing the Dual Tone Multi Frequency (DTMF) keys on the handset keypad. An IS DTMF KEY PRESSED? decision step 208 looks for the subscriber's response. If the subscriber does not wish to receive the associated SMS message, they may press another key as instructed, disconnect the call, etc. The method 200 will then proceed to an END step 210. If the subscriber wants the m-coupon, they press the specified key to generate a DTMF tone. Such DTMF tone is transmitted to the Open Call Media Platform 102 and requests the associated SMS message via SMS gateway 106 in a TRANSMIT REQUEST TO SMS GATEWAY step 212.

The SMS gateway 106 interacts with the Ad Delivery system 108 to get the requested SMS message in a GET SMS MESSAGE step 214. The SMS gateway 106 also checks whether the subscriber is eligible to receive the SMS message in an IS SUBSCRIBER ELIGIBLE TO RECEIVE THIS SMS MESSAGE? decision step 216. If the subscriber is not eligible to receive this SMS message, the method 200 then proceeds to a TRANSMIT ALTERNATIVE MESSAGE step 218, where the subscriber may receive an alternative SMS message. If the subscriber is eligible to receive the SMS message, the method 200 proceeds to an EMBED LOGO step 220.

Subscriber message eligibility may be pre-defined by the relevant sponsor. One objective for defining eligibility is to limit the number of m-coupons or SMS messages with the same content. Some examples of eligibility conditions include: "Is subscriber receiving this SMS message for the first time?", "Is subscriber receiving this SMS message for less than 'X' times?, where 'X' is predetermined by the sponsor" and "Is subscriber receiving this SMS message for less than 'X' times during 'Y' time period?, where 'Y' is also predetermined by the sponsor".

Existing m-coupons or SMS messages can be forwarded from a subscriber to another mobile phone user. A subscriber that did not subscribe to the Sponsor Call service or listen to the audio message can also benefit from the associated SMS messages or m-coupons. But to prevent other users from benefiting, an authenticating symbol is embedded in the SMS message. If the subscriber forwards the SMS message to another mobile phone user, the logo will be automatically and unavoidably deleted while the remaining portion of the SMS message is forwarded intact. Retailers can thus be warned not to accept any m-coupons or SMS messages lacking the authenticating symbol, such as the sponsor's logo. Such logo is preferably placed in a prominent position. For example, by displaying it in the background or foreground of the message, to prevent unauthorized and indiscriminate distribution of the m-coupons. The logo may be embedded in an encoded format in a User Data Header of the SMS message. For example, see the GSM standards and provided by the ETSI organization, especially GSM 03.40 and GSM 03.38.

After the EMBED LOGO step 220, the SMS message is transmitted to the subscriber via the telecommunication operator's SMS center 110 and the wireless network 112 in a TRANSMIT SMS MESSAGE step 222. The SMS message is transmitted to the subscriber only after the call initiated by the subscriber ends to ensure the SMS message is not sent in the midst of the call but after it concludes.

When the SMS message is successfully transmitted, the transmission status is updated in the Ad Delivery system 108 in an UPDATE STATUS step 224. The transmission count to subscribers for each type of SMS message is stored in a database for use in a feedback mechanism. The feedback mechanism is incorporated in the IS SUBSCRIBER ELIGIBLE TO RECEIVE THIS SMS MESSAGE? decision step 216 for (1) measuring effectiveness of the advertising efforts and (2) for preventing an excessive number of m-coupons or SMS messages from being sent to the same subscriber. In the former purpose, such data may be collated for enabling the sponsors to assess and refine their advertising strategies. In the latter purpose, the collated data is used to ascertain whether a subscriber is eligible to receive a particular m-coupon or SMS message to limit the number of times a same SMS message or m-coupons can be transmitted to a particular subscriber.

Although the present invention has been described in terms of the present embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method for transmitting SMS messages, comprising:
   recognizing a particular subscriber has initiated a GSM telephone call;
   associating said particular subscriber with any subscriber profile information maintained in a database;
   selecting an SMS message for transmission to said particular subscriber depending on said subscriber profile information;
   including an authenticating symbol in said SMS message that cannot be forwarded by said particular subscriber, wherein the authentication symbol is information visually identifiable by a recipient, is usable by the recipient to authenticate the SMS message, is embedded in a coupon in the SMS message, and is usable to visually determine whether a coupon holder is authorized to use the coupon; and
   transmitting said SMS message and said authenticating symbol at the conclusion of said GSM telephone call.

2. The method according to claim 1 further comprising the step of:
   ascertaining any eligibility of said particular subscriber to receive said SMS message.

3. The method according to claim 2, wherein:
   the step of ascertaining any eligibility further comprises limiting the number of times said SMS message can be transmitted to any subscriber.

4. The method according to claim 1, further comprising the step of:
   preventing any forwarding of said authenticating symbol to any another destination by blocking its retransmission in a copy of said SMS message.

5. The method of claim 4, wherein the SMS message is operable to be forwarded without the authentication symbol.

6. The method according to claim 1, wherein:
   the step of transmitting is such that an alternative message is sent if said particular subscriber is determined to not be eligible to receive said SMS message based on an eligibility criteria.

7. The method according to claim 1, wherein the step of selecting an SMS message is initiated in response to a user input.

8. The method according to claim 1, wherein the step of associating includes determining current location of said subscriber and using an SMS message appropriate for said current location.

9. The method of claim 1, further comprising:
   receiving a user request for an SMS message during the call from the subscriber that initiated the call.

10. An SMS messaging system, comprising:
    a database for storing a set of mobile telephone subscriber profiles;
    a call handler for dealing with a call progression of a particular mobile telephone subscriber, wherein the call handler accepts user requests for SMS messages during calls and transmits the requests to an SMS message servicer;
    an associating process module for matching particular ones of said mobile telephone subscribers to a corresponding one of said mobile telephone subscriber profiles; and
    the SMS message servicer for receiving a user request received during a call for an SMS message from the call handler and transmitting a selected SMS message with an embedded authenticating symbol to a particular mobile telephone subscriber in response to the received user request, wherein the particular mobile telephone subscriber is determined to be eligible to receive the selected SMS message based on said corresponding one of said subscriber profiles and the authentication symbol is information visually identifiable by a recipient, is usable by the recipient to authenticate the SMS message, is embedded in a coupon in the SMS message, and is usable to visually determine whether a coupon holder is authorized to use the coupon.

11. The messaging system according to claim 10, wherein said authenticating symbol is embedded in said SMS message but is nevertheless not forwardable, and said SMS message is forwardable without the authentication symbol.

12. The messaging system according to claim 10, wherein the SMS message servicer transmits en alternative message to said particular mobile telephone subscriber if otherwise ineligible to receive the said selected SMS message bused an a criteria.

13. The messaging system according to claim 10, wherein: said mobile telephone subscriber profile includes a current location entry for said subscriber.

14. The messaging system according to claim 10, further comprising: a database for storing a count of how many SMS messages have been sent to any subscriber in order to limit duplications.

* * * * *

UNITED STATES PATENT AND TRADEMARK OFFICE
CERTIFICATE OF CORRECTION

PATENT NO. : 7,548,754 B2
APPLICATION NO. : 10/412024
DATED : June 16, 2009
INVENTOR(S) : Asha Attur Shivaram et al.

It is certified that error appears in the above-identified patent and that said Letters Patent is hereby corrected as shown below:

In column 6, line 41, in Claim 12, delete "en" and insert -- an --, therefor.

In column 6, line 43, in Claim 12, delete "bused an" and insert -- based on --, therefor.

Signed and Sealed this

Thirteenth Day of July, 2010

David J. Kappos
*Director of the United States Patent and Trademark Office*